United States Patent
Himmel et al.

(10) Patent No.: US 6,453,342 B1
(45) Date of Patent: *Sep. 17, 2002

(54) METHOD AND APPARATUS FOR SELECTIVE CACHING AND CLEANING OF HISTORY PAGES FOR WEB BROWSERS

(75) Inventors: Maria Azua Himmel; Herman Rodriguez, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/204,922

(22) Filed: Dec. 3, 1998

(51) Int. Cl.[7] ............................................. G06F 15/167
(52) U.S. Cl. .................... 709/213; 709/216; 711/135
(58) Field of Search ................. 709/230, 231, 709/213, 216; 711/135, 136, 139

(56) References Cited

U.S. PATENT DOCUMENTS

| 5,774,660 | A |   | 6/1998 | Brendel et al. ............. 395/200 |
| 5,787,470 | A |   | 7/1998 | DeSimone et al. ......... 711/214 |
| 6,070,184 | A | * | 5/2000 | Blount at al. ............... 709/200 |
| 6,269,403 | B1 | * | 7/2001 | Andrs ......................... 709/231 |
| 6,314,492 | B1 | * | 11/2001 | Allen et al. ................. 711/135 |

OTHER PUBLICATIONS

Cache tag ver. 1.4 http://coldjava.hypermart.net/servlets/cachetag No date.*
Claa ClearCache http://www.nada.kth.se/projects/prup98/web_proxy/doc/rabbit/meta/ClearCache No date.*

* cited by examiner

Primary Examiner—Mehmet B. Geckil
(74) Attorney, Agent, or Firm—Duke W. Yee; Jeffrey S. LaBaw

(57) ABSTRACT

A method and apparatus in a data processing system for selectively caching web information in a cache for a browser. Web content is first retrieved by the browser during a browsing session. The web content is parsed for an indication of how the page should be stored. The web content is then stored using the indication. For example, retrieved web content may be parsed for an indication that the web content is to be removed after the browsing session terminates. Responsive to identifying the indication, the web content is cleared from the cache in response to the browsing session terminating.

20 Claims, 3 Drawing Sheets

METHOD AND APPARATUS FOR SELECTIVE CACHING AND CLEANING OF HISTORY PAGES FOR WEB BROWSERS

BACKGROUND OF THE INVENTION

1. Technical Field

The present invention relates generally to an approved data processing system and in particular to managing information stored in a data processing system. Still more particularly, the present invention relates to a method and apparatus for managing pages retrieved by a browser.

2. Description of Related Art

Internet, also referred to as an "internetwork", in communications is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Currently, the most commonly employed method of transferring data over the Internet is to employ the World Wide Web environment, also called simply "the web". Other Internet resources exist for transferring information, such as File Transfer Protocol (FTP) and Gopher, but have not achieved the popularity of the web. In the web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other web resources identified by a Uniform Resource Locator (URL). A URL is a special syntax identifier defining a communications path to specific information. Each logical block of information accessible to a client, called a "page" or a "web page", is identified by a URL. The URL provides a universal, consistent method for finding and accessing this information by a web "browser". A browser is a program capable of submitting a request for information identified by a URL at the client machine. Retrieval of information on the web is generally accomplished with an HTML-compatible browser, such as, for example, Netscape Communicator, which is available from Netscape Communications Corporation.

When a user desires to retrieve a document, such as a web page, a request is submitted to a server connected to a client computer at which the user is located and may be handled by a series of servers to effect retrieval of the requested information. The selection of a document is typically performed by the user selecting a hypertext link. The hypertext link is typically displayed by the browser on a client as a highlighted word or phrase within the document being viewed with the browser. The browser then issues a hypertext transfer protocol (HTTP) request for the requested documents to the server identified by the requested document's URL. The server then returns the requested document to the client browser using the HTTP. The information in the document is provided to the client formatted according to HTML. Typically, browsers on personal computers (PCs) along with workstations are typically used to access the Internet. The standard HTML syntax of web pages and the standard communication protocol (HTTP) supported by the World Wide Web guarantee that any browser can communicate with any web server.

Web pages retrieved by a browser are stored or cached by the browser on the data processing system on which the browser is running. In addition, the browser maintains a list of pages received by a user. This list is also referred to as a history list. A subdirectory under the main program directory of the browser is typically set up to cache visited pages. Caching is a quick way to speed up access to the World Wide Web by storing the pages on a hard disk. By having the page data stored locally, the browser can access the page right from the computer rather than waiting for it to download from the Internet. As a result, the next time a page is accessed that was visited previously, the page loads quickly from the hard disk on the computer. The browser also caches any Java applet class files (byte code) which was contained on pages that were visited. In addition, once a browser window displays an encrypted page, the disk cache retains an unencrypted copy of the page in an unencrypted form. Anyone having access to the disk cache can view the contents of the page.

The history list in a browser offers a convenient means of redisplaying pages that were previously viewed. Unlike bookmark lists, which store page locations that were designated by a user, history items are saved automatically when a page is displayed by a browser. From the history list, previously viewed pages may be viewed at a later time without being connected to the Internet. On Windows and Unix browsers, the history window displays a page's title, URL, first visited date, last visited date, expiration date, and number of visits.

Thus, anyone who is able to access the cache or history list for a browser will be able to view pages retrieved by a user, including encrypted pages. This ability to view retrieved pages and the history list creates a privacy and security concern for many users who receive or view confidential or encrypted documents that have been retrieved from the Internet. This concern may be partially alleviated through the use of various security mechanisms available to restrict access to the user's computer. However, users will often access different computers when performing various tasks. In addition, in commercial environments, more applications are beginning to use interfaces that involve browsers or browser type applications to make transfers across the Internet. With multiple users having access to the same computer, the concerns of confidentiality and security may not be alleviated as easily by known security mechanisms because a user that is allowed to access the computer may not have the same privileges with respect to the information retrieved by other users of the same computer.

Therefore, it would advantageous to have an improved method and apparatus for managing information retrieved by browsers.

SUMMARY OF THE INVENTION

The present invention provides a method and apparatus in a data processing system for selectively caching web information in a cache for a browser. Web content is first retrieved by the browser during a browsing session. The web content is parsed for an indication of how the page should be stored. The web content is then stored using the indication. For example, retrieved web content may be parsed for an indication that the web content is to be removed after the browsing session terminates. Responsive to identifying the indication, the web content is cleared from the cache in response to the browsing session terminating.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
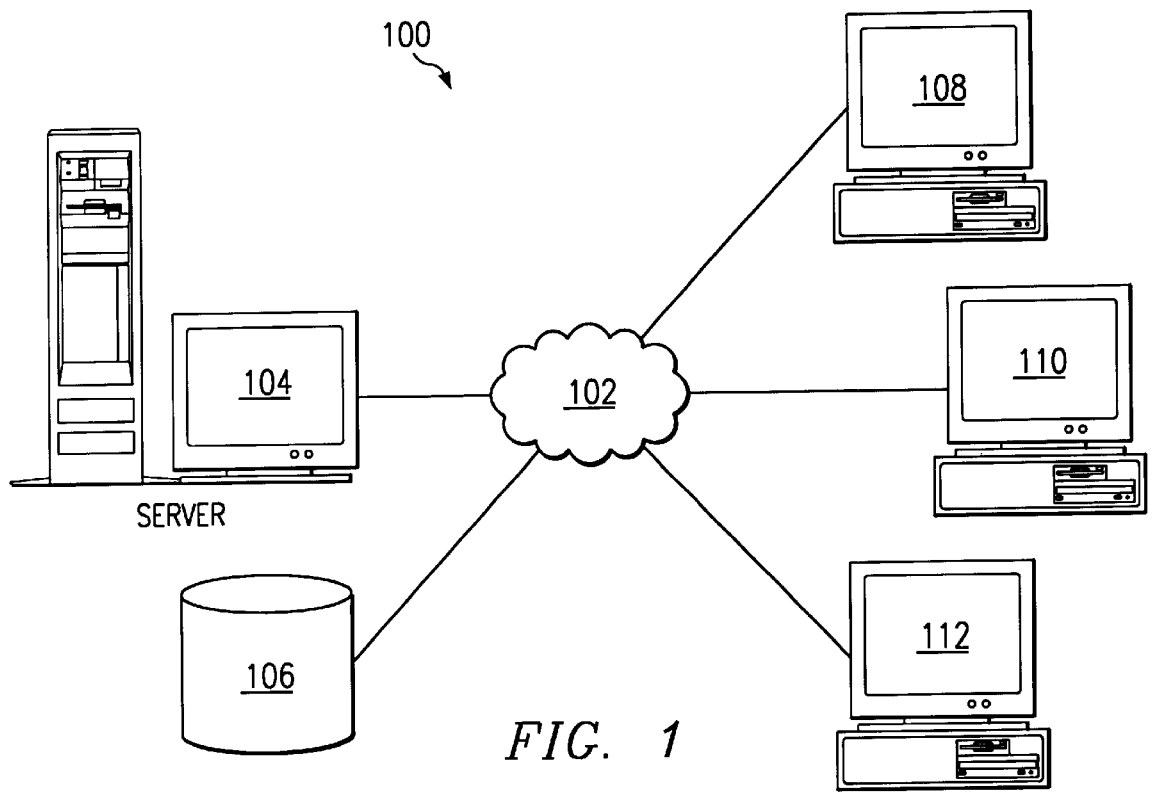
FIG. 1 is a pictorial representation of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program data, or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as any number of different types of networks, such as, for example, an intranet or a local area network.

FIG. 1 is intended as an example, and not as an architectural limitation for the processes of the present invention.

Figure 2:
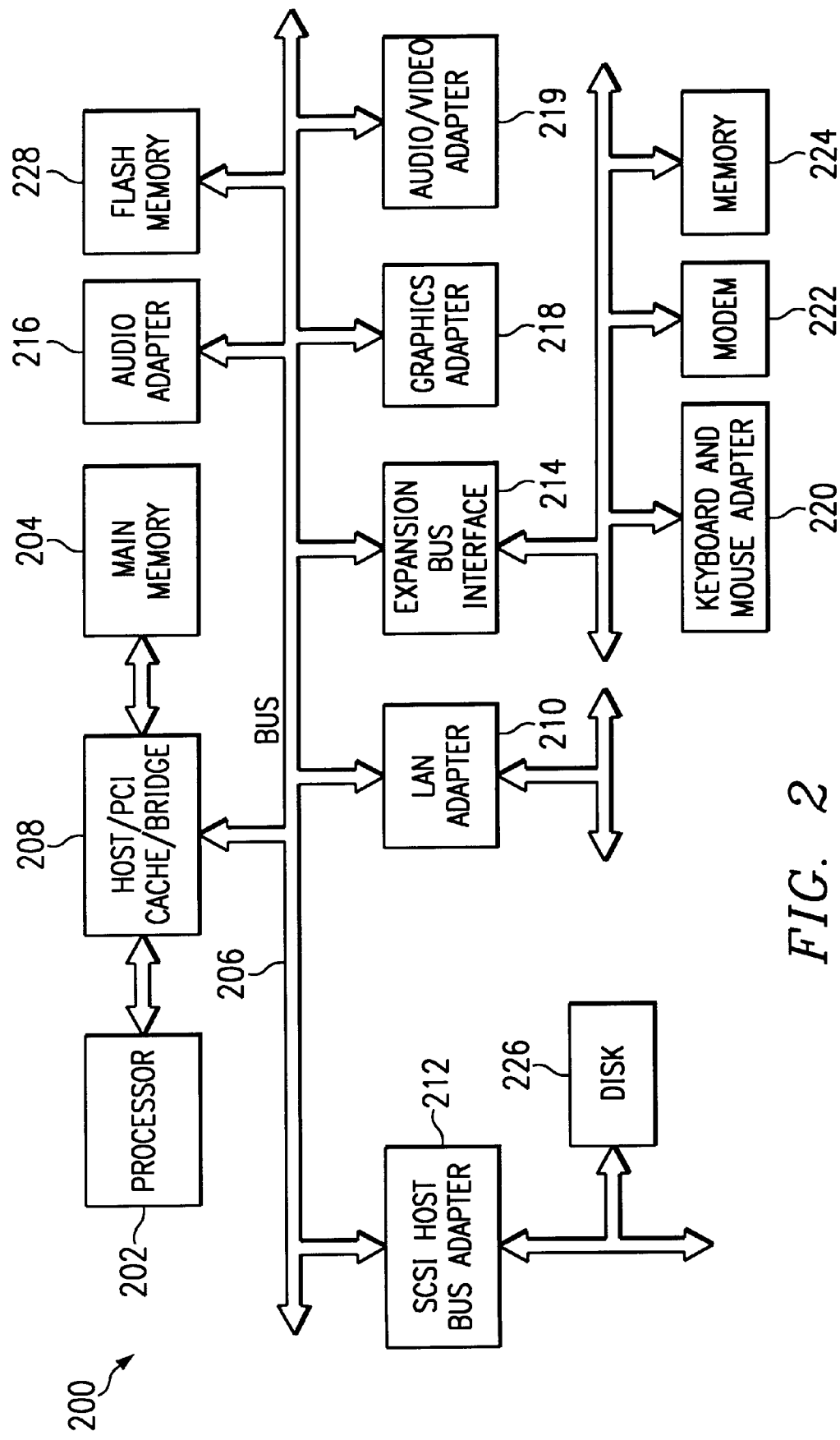
FIG. 2 is a block diagram of a data processing system in which the present invention may be implemented.

With reference now to FIG. 2, a block diagram of a data processing system in which the present invention may be implemented is illustrated. Data processing system 200 is an example of a client computer. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, CD-ROM drive 230, and digital video disc read only memory drive (DVD-ROM) 232 in the depicted example. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on a data processing system 200. Instructions for the operating system, the object-oriented operating system, and applications or programs are located on storage devices, such as hard disk drive 226 and may be loaded into main memory 204 for execution by processor 202.

Those of ordinary skill in the art will appreciate that the hardware in FIG. 2 may vary depending on the implementation. For example, other peripheral devices, such as optical disk drives and the like may be used in addition to or in place of the hardware depicted in FIG. 2. The depicted example is not meant to imply architectural limitations with respect to the present invention. For example, the processes of the present invention may be applied to a multiprocessor data processing system.

The present invention provides a method, apparatus, and instructions for selectively caching and/or cleaning information retrieved by a browser. The present invention provides a mechanism for selectively clearing unique cached data from a browser's cache and history list. In addition to selective clearing of cached data, the present invention allows for clearing of the entire cache or history list. This mechanism is provided through the use of HTML tags. These tags provide indications as to how a page is to be treated or processed by the browser.

Figure 3:
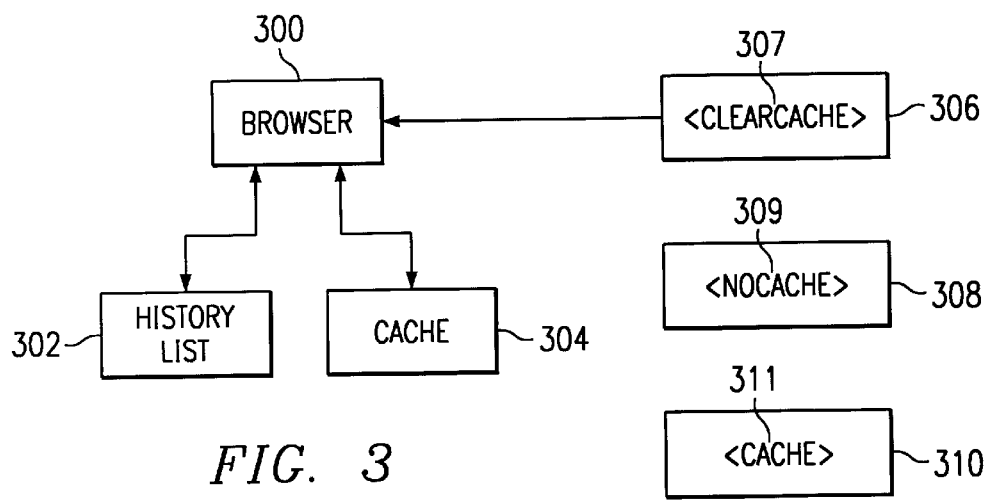
FIG. 3 is a diagram illustrating components used in managing information retrieved by a browser in accordance with a preferred embodiment of the present invention.

With reference now to FIG. 3, a diagram illustrating components used in managing information retrieved by a browser is depicted in accordance with a preferred embodiment of the present invention. Browser 300 stores information about pages in page history 302 and stores pages received in cache 304. Browser 300 in the depicted example executes on a computer, such as data processing system 200 as described above. In this example, the processes implemented in browser 300 may be implemented in a browser, such as Netscape Communicator, which is available from Netscape Communications Corporation. Of course browser 300 may be implemented using other browser programs or applications, such as, for example, Internet Explorer, which is available from Microsoft Corporation. The processes of the present invention also may be applied to other programs that retrieve content from the Internet.

In the depicted example, browser 300 may receive three types of pages. Page 306 contains a clear cache HTML tag 307, which reads as follows: <CLEARCACHE>. This tag indicates that the browser is to clear the cache and page history list of all pages containing a clear cache HTML tag. Page 308 includes a no cache HTML tag 309 as follows: <NOCACHE>. No cache HTML tag 309 inhibits caching of page 308. Page 310 contains a cache HTML tag 311 as follows: <CACHE>. This HTML tag may be an optional tag with the default behavior to cache the pages. Alternatively, the cache HTML tag may cause the page to be cached or retained for a longer than normal period of time. For example, a page might normally be cached for 5 days, but the cached HTML tag may cause the page to be cached for 10 days. Such a selection may be set, for example, in the preference settings for a browser.

These tags may be dynamically generated by applications, such as JavaScript. As a result, a cache HTML tag may override a no cache HTML tag. In such a case, the page will be cached and the URL will be placed in the history list. If no tag is present to indicate how a page is to be cached, the default is to cache the page. A tag is typically placed on each page to indicate how the page should be cached or stored.

When browser 300 encounters a page, such as page 308 or 310, a timer is started. A timeout value for the timer is selected for clearing the cache and the history list. This value specifies a threshold time during which browser 300 is idle. For example, browser 300 will be idle when it is not processing any page requests. A value of zero set in the browser preference inhibits clearing of the cache and history list. In the depicted example, this is the default value. This value may be set directly by the user or the system administrator, or may be set within one of the HTML tags. For example, the user or system administrator for the browser may set a 60 second timeout value to have the browser clear the cache and history list after 60 seconds or inactivity. An alternative is to include the timeout value in the <CLEARCACHE> tag so that the cache for the current page is cleaned after the specified idle time. Alternatively, the <CLEARCACHE> tag may be employed to clear the cache after a browser session ends.

Figure 4:
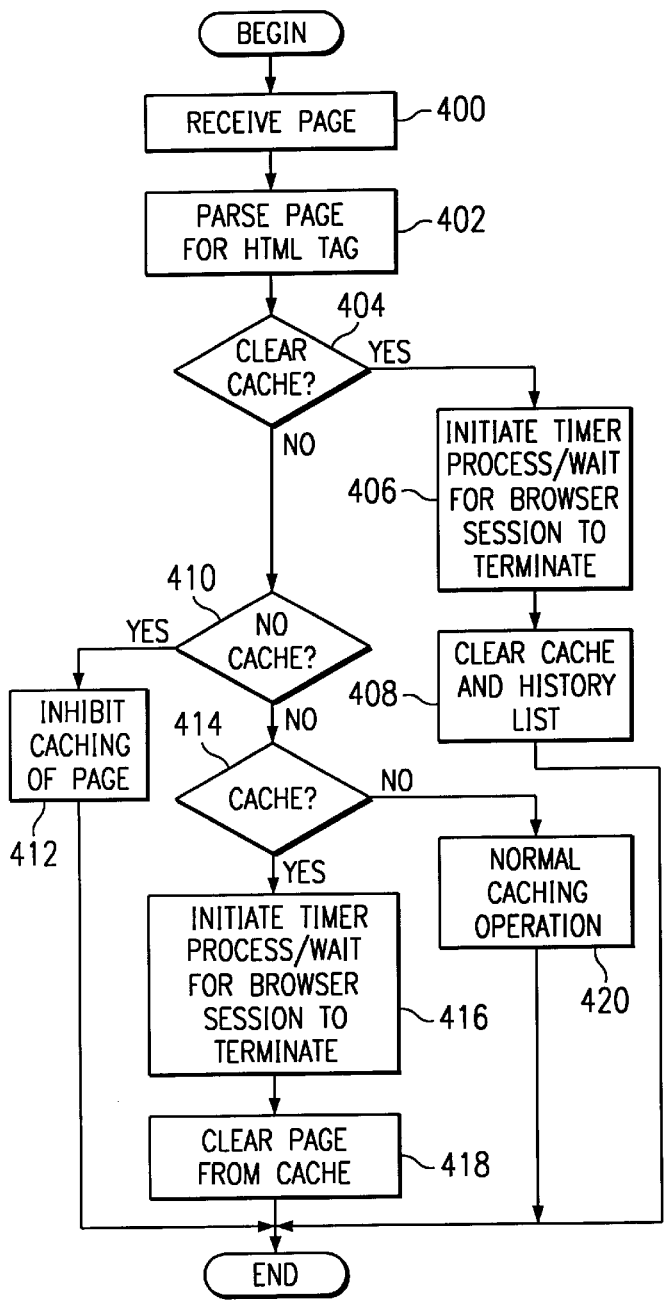
FIG. 4 is a flowchart of the process for processing pages in accordance with a preferred embodiment of the present invention.

With reference now to FIG. 4, a flowchart of the process for processing pages is depicted in accordance with a preferred embodiment of the present invention. The process in FIG. 4 is implemented in a browser such as browser 300. This process may be applied to each HTML tag encountered in a page retrieved or received by a browser. In the depicted example, a subsequent tag on a page may override or change processing set by a previous tag. The process begins by receiving a page (step 400). Thereafter, the page is parsed for an HTML tag (step 402). A determination is made as to whether a clear cache HTML tag has been encountered (step 404). If a clear cache HTML tag has been encountered, a timer process is initiated or the process waits for the browser session to terminate (step 406). Whether a timer process is used or whether the process waits for the browser session to end, depends on the particular implementation. Then, after the timer process completes, the cache and the history list are cleared (step 408) with the process terminating thereafter. Otherwise a determination is made as to whether a no cache HTML tag has been encountered (step 410). If a no cache HTML tag is encountered, caching of the page is inhibited (step 412) with the process terminating thereafter.

If the HTML tag encountered in step 410 is not a no cache HTML tag, a determination is made as to whether the HTML tag is a cache HTML tag (step 414). If the HTML tag is a cache tag, a timer process is initiated or the process waits for the browser session to terminate (step 416). After the timer process has completed or the browser session has terminated, the page is cleared from the cache (step 418) with the process terminating thereafter. Otherwise, normal browser caching operations take place (step 420) with the process terminating thereafter.

Figure 5:
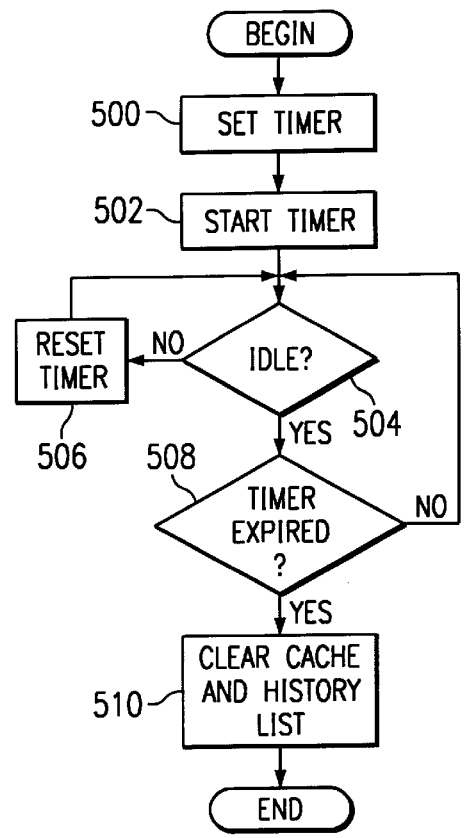
FIG. 5 is a flowchart of a timer process in accordance with a preferred embodiment of the present invention.

Turning now to FIG. 5, a flowchart of a timer process is depicted in accordance with a preferred embodiment of the present invention. This timer process is a more detailed description of steps 412 and 416 from FIG. 4. The process begins by setting a timer using a timeout value (step 500). This timeout value may be set by the user through preference options in the browser. Alternatively, the value may be set by a tag that causes the initiation of the timer process. This value may be set within one of the existing tags indicating how the page should be cached, or the initiation of the timer process can be set through a new tag as follows: <CLEARCACHE 20>. In this example, the cache would be cleared after 20 seconds in the timer process. This timeout value is used to indicate an amount of time that is to pass before the cache and history list for the browser are cleared. Next, the time is started (step 502). A determination is then made as to whether the browser is idle (step 504). In the depicted example, the browser may be idle when no page requests are being processed. Other activities also may be used to determine when a browser is idle. If the browser is not idle, the timer is reset (step 506), otherwise, a determination is made as to whether the timer has expired (step 508). If the timer has not expired the process returns to step 504 otherwise, the cache and history list are cleared (step 510) with the process terminating thereafter.

In addition to clearing the cache and history list, a document list maintained by the operating system also may be cleared in accordance with a preferred embodiment of the present invention. This document list contains documents opened or viewed by a user, which may include pages retrieved by the browser. The clearing of the cache and history list in step 510 may clear all of the contents of the cache and history list. Alternatively, selected pages and history list entries may be cleared. These pages and entries may be selected based on a presence of HTML tags, such as, for example, a cache HTML tag.

Figure 6:
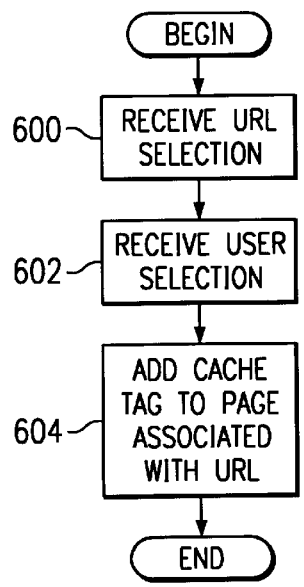
FIG. 6 is a flowchart for the process for selectively caching pages associated with a Universal Resource Locator (URL) in accordance with a preferred embodiment of the present invention.

With reference now to FIG. 6, a flowchart for the process for selectively caching pages associated with a Universal Resource Locator (URL) is depicted in accordance with a preferred embodiment of the present invention. The process in FIG. 6 may be used to set a class of pages, such as those from a given URL, for selective caching with cache tags as described above. The process begins by receiving the selection of a URL (step 600). This selection of the URL may be performed in a manner similar to adding a bookmark for a URL to a bookmark file. In this case, however, all of the pages associated with the URL will be selectively cached. Next, a selection is received as to how to cache the pages (step 602). This selection may include various caching features as described above. For example, a no cache feature may be used such that caching of any pages associated with this URL are inhibited. Alternatively, other cache tags may be selected by the user depending on user preferences. Thereafter, a cache tag is associated to each of the pages associated with the URL (step 604). In this manner, a group of pages associated with a URL may be selectively cached by a user. Such a process may be invoked in a number of ways, including, for example, as a command selected from a menu in the browser or as a command initiated as a function key.

It is important to note that while the present invention has been described in the context of a fully functioning data processing system, those of ordinary skill in the art will appreciate that the processes of the present invention are capable of being distributed in a form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for selectively caching web information in a cache for a browser comprising:
    retrieving web content by the browser, wherein the web content is retrieved web content received during a browsing session;
    parsing the retrieved web content for an indication that the web content is be removed from a cache after the browsing session terminates; and
    responsive to identifying the indication, clearing the web content from the cache in response to the browsing session terminating.

2. The method of claim 1 further comprising:
    removing a universal resource locator associated with the retrieved web content from a history list of the browser in response to the browser session terminating.

3. The method of claim 1 further comprising:
    removing a document list held by an operating system.

4. A method in a browser for processing pages from a distributed data processing system, the method comprising:
    retrieving a page from the distributed data processing system;
    parsing the page for an indication of how the page should be cached;
    clearing a cache in response to encountering a clear indication while parsing the page; and
    clearing a page history list in response to encountering the clear indication.

5. The method of claim 4, wherein the page is stored in cache and further comprising:
    clearing the cache after a period of time passes while the browser is idle.

6. The method of claim 5, wherein a universal resource locator associated with the page is stored in a history list and further comprising:
    clearing the history list after a period of time passes while the browser is idle.

7. The method of claim 4, wherein the page is normally cached for a default period of time and wherein the indication causes the page to be cached longer than the default period of time.

8. A method in a browser for processing pages from a distributed data processing system, the method comprising:
    retrieving a page from the distributed data processing system;
    parsing the page for an indication of how the page should be cached;
    caching the page in a cache; and
    removing the page from the cache after a browsing session ends in response to the indication being an end indication.

9. A data processing system for selectively caching web information in a cache for a browser comprising:
    retrieving means for retrieving web content by the browser, wherein the web content is retrieved web content received during a browsing session;
    parsing means for parsing the retrieved web content for an indication that the web content is be removed from a cache after the browsing session terminates; and
    clearing means, responsive to identifying the indication, for clearing the web content from the cache in response to the browsing session terminating.

10. The data processing system of claim 9 further comprising:
    removing means for removing a universal resource locator associated with the retrieved web content from a history list of the browser in response to the browser session terminating.

11. The data processing system of claim 9 further comprising:
    removing means for removing a document list held by an operating system.

12. A data processing system in a browser for processing pages from a distributed data processing system, the data processing system comprising:
    retrieving means for retrieving a page from the distributed data processing system;
    parsing means for parsing the page for an indication of how the page should be cached;
    first clearing means for clearing a cache in response to encountering a clear indication while parsing the page; and
    second clearing means for clearing a page history list in response to encountering the clear indication.

13. The data processing system of claim 12, wherein the page is stored in cache and further comprising:

clearing means for clearing the cache after a period of time passes while the browser is idle.

14. The data processing system of claim 13, wherein a universal resource locator associated with the page is stored in a history list and further comprising:

clearing means for clearing the history list after a period of time passes while the browser is idle.

15. A data processing system for processing pages from a distributed data processing system, the data processing system comprising:

retrieving means for retrieving a page from the distributed data processing system;

parsing means for parsing the page for an indication of how the page should be cached;

caching means for caching the page in a cache; and removing means for removing the page from the cache after a browsing session ends in response to the indication being an end indication.

16. A computer program product in a computer readable medium for selectively caching information from pages from a distributed data processing system, computer program product comprising:

first instructions for retrieving web content by the browser, wherein the web content is retrieved web content received during a browsing session;

second instructions for parsing the retrieved web content for an indication that the web content is be removed from a cache after the browsing session terminates; and third instructions for, responsive to identifying the indication, clearing the web content from the cache in response to the browsing session terminating.

17. A computer program product in a computer readable medium for selectively caching information from pages from a distributed data processing system, computer program product comprising:

first instructions for retrieving a page from the distributed data processing system;

second instructions for parsing the page for an indication of how the page should be cached; and third instructions for caching the page using the indication.

18. The computer program product claim 17, wherein the indication is an end indication and wherein the first instructions comprise:

instructions for caching the page in a cache; and instructions for removing the page from the cache after a browsing session ends.

19. The computer program product of claim 17, wherein the page is stored in cache and further comprising:

fourth instructions for clearing the cache after a period of time passes while the browser is idle.

20. The computer program product of claim 17, wherein the page is normally cached for a default period of time and wherein the indication causes the page to be cached longer than the default period of time by the third instructions.

* * * * *